US009077469B2

(12) United States Patent
Xie (10) Patent No.: US 9,077,469 B2
(45) Date of Patent: Jul. 7, 2015

(54) ADAPTING APPARATUS AND METHOD

(75) Inventor: Gang Xie, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 504 days.

(21) Appl. No.: 13/390,098

(22) PCT Filed: Apr. 21, 2010

(86) PCT No.: PCT/CN2010/072007
§ 371 (c)(1),
(2), (4) Date: Feb. 10, 2012

(87) PCT Pub. No.: WO2011/017937
PCT Pub. Date: Feb. 17, 2011

(65) Prior Publication Data
US 2012/0141123 A1    Jun. 7, 2012

(30) Foreign Application Priority Data

Aug. 12, 2009  (CN) .......................... 2009 1 0166113

(51) Int. Cl.
*H04J 14/00* (2006.01)
*H04J 14/06* (2006.01)
(Continued)

(52) U.S. Cl.
CPC .. *H04J 3/12* (2013.01); *H04J 14/02* (2013.01); *H04J 3/085* (2013.01); *H04J 3/1652* (2013.01)

(58) Field of Classification Search
CPC ........... H04J 3/085; H04J 3/12; H04J 3/1652; H04J 3/14; H04J 14/0273; H04J 2203/006; H04J 2203/0085; H04J 3/1658; H04J 14/0227; H04J 14/0258; H04J 14/0268; H04J 3/1664; H04J 14/0284; H04J 14/02; H04J 14/0212; H04J 14/026; H04J 14/002; H04J 14/0283

USPC ................................................ 398/66, 45, 43
See application file for complete search history.

(56) References Cited

U.S. PATENT DOCUMENTS 5,594,927 A * 1/1997 Lee et al. ......................... 710/66
7,492,774 B2 * 2/2009 Lohr ............................. 370/401
(Continued)

FOREIGN PATENT DOCUMENTS

| CN | 1625091 | 6/2005 |
| CN | 1753383 | 3/2006 |

(Continued)

OTHER PUBLICATIONS

ISR for related PCT/CN2010/072007 mailed on Jul. 29, 2010, and its English translation.
(Continued)

*Primary Examiner* — Ken Vanderpuye
*Assistant Examiner* — Abbas H Alagheband
(74) *Attorney, Agent, or Firm* — Ladas & Parry, LLP (57) ABSTRACT

The present invention discloses an adapting apparatus and method, the apparatus comprises: an adapter pool, wherein the adapter pool is located between an optical data unit (ODUk) layer and an optical channel (OCh) layer, and the adapter pool comprises one or more adapters which are respectively connected to an OCh layer link and an ODUK layer link; the information that the adapter pool used for managing comprises: information for indicating connectivity of the adapter with the OCh layer link and with the ODUk layer link, and information for indicating an adapter capability of the adapter. The adapting information between MRNs can be described more accurately through the present invention, and the correctness of the route calculation results is guaranteed.

14 Claims, 8 Drawing Sheets

(51) Int. Cl.
*H04J 3/12* (2006.01)
*H04J 3/16* (2006.01)
*H04J 14/02* (2006.01)
*H04J 3/08* (2006.01)

(56) References Cited

U.S. PATENT DOCUMENTS

| | | | | |
|---|---|---|---|---|
| 7,539,196 B2* | 5/2009 | Flavin et al. | | 370/394 |
| 7,606,494 B1* | 10/2009 | Weston-Dawkes et al. | | 398/83 |
| 7,782,843 B2* | 8/2010 | Zou et al. | | 370/360 |
| 7,936,990 B2* | 5/2011 | Yan et al. | | 398/5 |
| 7,948,975 B2* | 5/2011 | Markus et al. | | 370/366 |
| 7,949,255 B2* | 5/2011 | Zou | | 398/58 |
| 8,005,359 B2* | 8/2011 | Wolf | | 398/52 |
| 8,040,878 B2* | 10/2011 | Lometti et al. | | 370/354 |
| 8,559,812 B2* | 10/2013 | Oltman et al. | | 398/5 |
| 2003/0016416 A1* | 1/2003 | Wolf | | 359/139 |
| 2003/0123493 A1* | 7/2003 | Takahashi | | 370/539 |
| 2004/0013137 A1* | 1/2004 | Lohr | | 370/539 |
| 2004/0062277 A1* | 4/2004 | Flavin et al. | | 370/474 |
| 2004/0208552 A1* | 10/2004 | Harney et al. | | 398/51 |
| 2005/0286521 A1* | 12/2005 | Chiang et al. | | 370/389 |
| 2006/0062246 A1* | 3/2006 | Lometti et al. | | 370/465 |
| 2007/0076769 A1* | 4/2007 | Zou | | 370/539 |
| 2007/0165517 A1* | 7/2007 | Binetti et al. | | 370/222 |
| 2007/0264015 A1* | 11/2007 | Li et al. | | 398/45 |
| 2007/0292129 A1* | 12/2007 | Yan et al. | | 398/5 |
| 2008/0037984 A1* | 2/2008 | Perkins et al. | | 398/43 |
| 2008/0095535 A1* | 4/2008 | Zou | | 398/58 |
| 2008/0107418 A1* | 5/2008 | Zhang | | 398/98 |
| 2009/0074410 A1* | 3/2009 | Zou et al. | | 398/52 |
| 2009/0175618 A1* | 7/2009 | Yan | | 398/25 |
| 2009/0180472 A1* | 7/2009 | Lometti et al. | | 370/389 |
| 2009/0220229 A1* | 9/2009 | Markus et al. | | 398/50 |
| 2010/0054731 A1* | 3/2010 | Oltman et al. | | 398/1 |
| 2010/0329155 A1* | 12/2010 | Kang | | 370/256 |
| 2012/0063452 A1* | 3/2012 | Cucchi et al. | | 370/389 |

FOREIGN PATENT DOCUMENTS

| | | |
|---|---|---|
| CN | 101001108 | 7/2007 |
| CN | 101471837 | 7/2009 |
| CN | 101499820 | 8/2009 |
| EP | 2061164 | 5/2009 |

OTHER PUBLICATIONS

IPRP/WO for related PCT/CN2010/072007 issued on Feb. 14, 2012, and its English translation.
Optical Network Manufacture Department General Working Office. Description of OTN Technology and Manufacture, Huawei Technologies Co Ltd. Jan. 26, 2007 [retrieved on Jul. 5, 2010]. Retrieved from the Internet: <URL:http://wenku.baidu.com/view/2831490203d8ce2f006623bd.html>.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Action     |                   Preserved                   |
+-+-+-+-+-+-+-+-+-+-+-+-+-+-+-+-+-+-+-+-+-+-+-+-+-+-+-+-+-+-+-+-+
|                       Adapter identify 1                      |
+-+-+-+-+-+-+-+-+-+-+-+-+-+-+-+-+-+-+-+-+-+-+-+-+-+-+-+-+-+-+-+-+
:                                :                              :
:                                :                              :
+-+-+-+-+-+-+-+-+-+-+-+-+-+-+-+-+-+-+-+-+-+-+-+-+-+-+-+-+-+-+-+-+
|                       Adapter identify N                      |
+-+-+-+-+-+-+-+-+-+-+-+-+-+-+-+-+-+-+-+-+-+-+-+-+-+-+-+-+-+-+-+-+
```

Fig. 5

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Action   |Pr   |   Form   |          Preserved             |
|             |ect  |          |                                |
|             |ion  |          |                                |
+-+-+-+-+-+-+-+-+-+-+-+-+-+-+-+-+-+-+-+-+-+-+-+-+-+-+-+-+-+-+-+-+
|                       Adapter identify 1                      |
+-+-+-+-+-+-+-+-+-+-+-+-+-+-+-+-+-+-+-+-+-+-+-+-+-+-+-+-+-+-+-+-+
:                              :                              :
:                              :                              :
+-+-+-+-+-+-+-+-+-+-+-+-+-+-+-+-+-+-+-+-+-+-+-+-+-+-+-+-+-+-+-+-+
|                       Adapter identify n                      |
+-+-+-+-+-+-+-+-+-+-+-+-+-+-+-+-+-+-+-+-+-+-+-+-+-+-+-+-+-+-+-+-+

0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Action    |   Preserved   |      Wavelength number         |
+-+-+-+-+-+-+-+-+-+-+-+-+-+-+-+-+-+-+-+-+-+-+-+-+-+-+-+-+-+-+-+-+
|Grid| C.S. |     Preserved    |      Lowest frequency n        |
+-+-+-+-+-+-+-+-+-+-+-+-+-+-+-+-+-+-+-+-+-+-+-+-+-+-+-+-+-+-+-+-+
|              Necessary addon domains in each action            |
```

ADAPTING APPARATUS AND METHOD

CROSS-REFERENCE TO RELATED APPLICATIONS

This application is the U.S. National Stage of International Patent Application No. PCT/CN2010/072007 filed on Apr. 21, 2010, which claims priority to Chinese Patent Application Number 200910166113.8 filed on Aug. 12, 2009, the disclosures of which are hereby incorporated by reference in their entireties.

FIELD OF THE INVENTION

The present invention relates to the communication field, and in particular to an adapting apparatus and method.

BACKGROUND OF THE INVENTION

At present, the transmission network technology is mainly divided into a synchronous digital hierarchy (SDH) technology and a wavelength division multiplexing (WDM) technology, and each technology has its own advantages and disadvantages: the SDH technology mainly processes electrical layer signals, and has the advantages of flexible scheduling, rich protection functions and complete operation administration and maintenance (OAM), but the bandwidth it provided is limited, which can not meet the growing service needs. The WDM technology can provide a large-capacity bandwidth through the multiplexing of wavelength, but it can not provide the flexible scheduling and rich protection functions because the immature of optical layer processing. Based on the advantages and disadvantages of the SDH and the WDM, the International Telecommunications Union-Telecommunications standardization sector (ITU-T) provides an optical transport network (OTN) system architecture which synchronously has the advantages of the SDH and the WDM.

However, the introduction of the OTN device brings another problem: a multiple layer network (MLN)/multiple region network (MRN) problem. In the generalized multi protocol label switching (GMPLS) network, one switching capability is defined as one region, and a converged network with multiple switching capabilities is the MRN. And a network with different rates under the same switching capability is the MLN. The OTN network is a typical MLN/MRN which contains two switching capabilities, that is the time division multiplexing (TDM) and the lambda switching capability (LSC). Wherein, the switching capability of an optical data unit k (ODUk) layer is TDM, and the switching capability of an optical channel layer (OCh) is LSC. In the ODUk layer, as the values of k are different, the service rates are different, e.g., ODU1 is 2.5 Gb/s, ODU2 is 10 Gb/s. Thus the ODUk layer network is an MLN.

In the OTN device, as there are two switching capabilities which are the LSC and the TDM, when a service is switched from a port of one switching capability to a port of another switching capability, it needs to judge according to the adapter capability between these ports, if the adapter capability meets the requirements of the service signals, the switching succeeds, and if not, the switching fails. At present, related extensions exist in the standard protocol, and in the draft-ietf-ccamp-gmpls-min-extensions, a structure for describing the switching capabilities, i.e., interface adapting capability description (IACD), is defined. But the adapter capability between the OCh and ODUk layers in the OTN device is not completely described in IACD, so the adapting information between MRNs is not very accurate when being described by the IACD, therefore the route calculation results can not be guaranteed.

Aiming at the problems of the related art that the adapting information between MRNs is not very accurate when being described by the IACD because the adapter capability of the OCh and ODUk layers in the OTN device is not completely described by the IACD, therefore the route calculation results can not be guaranteed, there is not yet an effective solution.

SUMMARY OF THE INVENTION

The invention is provided aiming at the problems that the adapting information between MRNs is not very accurate when being described by the IACD because the adapter capability of the OCh and ODUk layers in the OTN device is not completely described by the IACD in the related technologies, therefore the route calculation results can not be guaranteed. Therefore the present invention provides an improved adapting solution so as to solve at least one of the above problems.

An adapting apparatus is provided according to one aspect of the present invention.

The adapting apparatus according to the present invention comprises: an adapter pool, wherein the adapter pool is located between an ODUk layer and an OCh layer, and the adapter pool comprises one or more adapters which are respectively connected to an OCh layer link and an ODUk layer link; the information that the adapter pool used for managing comprises: information for indicating connectivity of the adapter with the OCh layer link and with the ODU layer link, and information for indicating an adapter capability of the adapter.

Preferably, the adapter comprises all adapting units which are connected to a same OCh cross matrix and to a same ODUk cross matrix, and have a same adapting rate.

Preferably, the adapter is connected with the OCh layer link through an OCh layer link connectivity matrix, wherein the OCh layer link connectivity matrix is configured to indicate the connectivity between an interface on the OCh side of the adapter and an interface of the OCh layer link connected with the adapter; the adapter is connected with the ODUk layer link through an ODUk link connectivity matrix, wherein the ODUk link connectivity matrix is configured to indicate the connectivity between an interface on the ODUk side of the adapter and an interface of the ODUk layer link connected with the adapter.

Preferably, the information for indicating the connectivity of the adapter with the OCh layer link and with the ODUk layer link comprises: information for indicating the connectivity between the adapter and the OCh layer link interface, and information for indicating the connectivity between the adapter and the ODUk layer link interface.

Preferably, the information for indicating an adapter capability of the adapter comprises the adapter capability descriptions of multiple adapter sets, and each set comprises: one or more adapters, one or more wavelengths and one IACD; information for indicating connectivity between an input direction of the adapter and the OCh layer link interface comprises multiple groups of connectivity information, and each group comprises: one or more OCh layer input interfaces, and one or more adapters; information for indicating connectivity between an output direction of the adapter and the OCh layer link interface comprises multiple groups of connectivity information, and each group comprises: one or more adapters, and one or more OCh link input interfaces; information for indicating connectivity between the adapter and the ODUk layer link interface comprises multiple groups of connectivity information, and each group comprises: one or more adapters, and one or more ODUk link interfaces.

Preferably, the above apparatus further comprises a flooding module, which is configured to flood the information of the adapter pool between the OCh layer and the ODUk layer as a constraint attribute in a node.

An adapting method is provided according to another aspect of the present invention.

The adapting method according to the present invention is used for managing the adapting information between photoelectric layers in OTN, and the method comprises: setting an adapter pool between an ODUk layer and an OCh layer, wherein the adapter pool comprises one or more adapters which are respectively connected to an OCh layer link and an ODUk layer link; for each adapter, information of the adapter pool comprises: information for indicating the connectivity of the adapter with the OCh layer link and with the ODUk layer link, and information for indicating an adapter capability of the adapter.

Preferably, all adapting units which are connected to a same OCh cross matrix and to a same ODUk cross matrix, and have a same adapting rate are taken as one same adapter.

Preferably, the adapter is connected with the OCh layer link through an OCh layer link connectivity matrix, wherein the OCh layer link connectivity matrix is configured to indicate connectivity between an interface on the OCh side of the adapter and an interface of the OCh layer link connected with the adapter; the adapter is connected with the ODUk layer link through an ODUk link connectivity matrix, wherein the ODUk link connectivity matrix is configured to indicate connectivity between an interface on the ODUk side of the adapter and an interface of the ODUk layer link connected with the adapter.

Preferably, the information of the adapter pool between the OCh layer and the ODUk layer is flooded as a constraint attribute in a node.

The invention realizes the adapting function using the adapter pool located between the OCh layer and the ODUk layer, wherein the information of the adapter pool comprises: the information for indicating the connectivity of the adapter with the OCh layer link and with the ODUk layer link, and the information for indicating an adapter capability of the adapter. The problem that the adapting information between MRNs is not very accurate when being described by the IACD because the adapter capability of the OCh and ODUk layers in the OTN device is not completely described by the IACD in the related technologies, therefore the route calculation results can not be guaranteed is solved, thus the adapting information between MRNs is more accurate when being described, and the correctness of the route calculation results can be guaranteed.

BRIEF DESCRIPTION OF THE DRAWINGS

The description of drawings is provided for further expressing the invention and forming a part of the application, the schematic embodiments and descriptions of the invention are used for explaining, but not limiting the invention. In the drawings.

DETAILED DESCRIPTION OF THE EMBODIMENTS

Considering the problem that the adapting information between MRNs is described incorrectly using the IACD because the adapter capability between the OCh and ODUk layers in the OTN device is not completely described by the IACD in the related technologies, therefore the correctness of the route calculation results can not be guaranteed, an embodiment of the present invention provides an adapting solution, i.e., an information model of an adapter pool between the OCh and ODUk layers in the OTN network, which is configured to manage the adapting information between the photoelectric layers in the OTN network. Wherein, the information of the adapter pool between the OCh and ODUk layers is modification and improvement of the IACD in the existing standards, i.e., the adapting functions between the OCh and ODUk layers in the OTN network are mainly realized through the adapter pool, and the information description of the adapter pool mainly comprises two aspects (i.e., the adapter pool manages the following two aspects of information): the first aspect, connectivity of the adapter with the OCh layer link and the ODUk layer link. This information mainly describes whether the adapter is connected with the OCh layer link and with the ODUk layer link, and only the ODUk layer link and the OCh layer link which are connected to the same adapter can transmit the service signals; the second aspect, adapter capability between the OCh layer link and the ODUk layer link. This adapter capability mainly comprises the adapting of the switching capability (adapting of LSC and TDM switching capability), support of encoding (whether the encoding of the OCh layer link and the ODUk layer link are consistent), a maximum adapting bandwidth and a minimum adapting bandwidth, and the wavelength range. In summary, the adapting apparatus in the adapting solution comprises: an adapter pool, wherein the adapter pool is located between an ODUk layer and an OCh layer, and the adapter pool comprises one or more adapters which are respectively connected to an OCh layer link and an ODUK layer link; for each adapter, information of the adapter pool comprises: information for indicating connectivity of the adapter with the OCh layer link and with the ODUk layer link, and information for indicating an adapter capability of the adapter.

It should be noted that, in the related standards, the adapter capability between MRNs is described through the IACD, and it is flooded as a attribute of the traffic engineering (TE) link, but through the description of the above adapter pool, it is improper to flood the adapter capability and connectivity of the OCh and ODUk layers as a TE link attribute, and the descriptions of IACD in the existing standards are not completely applicable. Thus, the information of the adapter pool between the OCh and ODUk layers is flooded as a constraint attribute in a node. Wherein, the flooded information comprises: TE router information, mainly used for describing an address of the router when implementing TE route calculation, the address is an stable IP address which generally uses a loopback interface; TE link information, used for describing the related link information for implementing TE route calculation, the main parameters comprises link type, link ID, local interface IP address, remote end interface IP address, TE cost, maximum bandwidth, unpreserved bandwidth, management set, link local/remote end identity, link protection attribute, interface switching capability description (ISCD) and shared risk link group (SRLG).

It should be noted that the embodiments of the application and the characters in the embodiments can be combined with each other if there are no conflicts. The present invention will be described in detail with reference to the accompanying drawings and in conjunction with embodiments hereinafter.

Apparatus Embodiments

Figure 1:
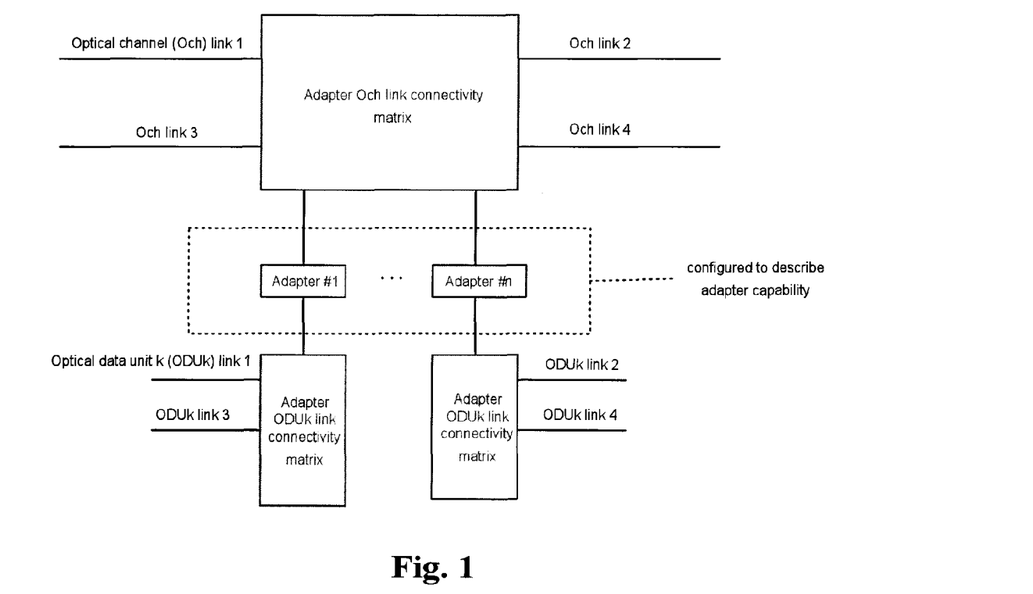
FIG. 1 is a schematic diagram of an adapter pool model between an OCh layer and an ODUk layer according to an embodiment of the present invention.
Figure 2:
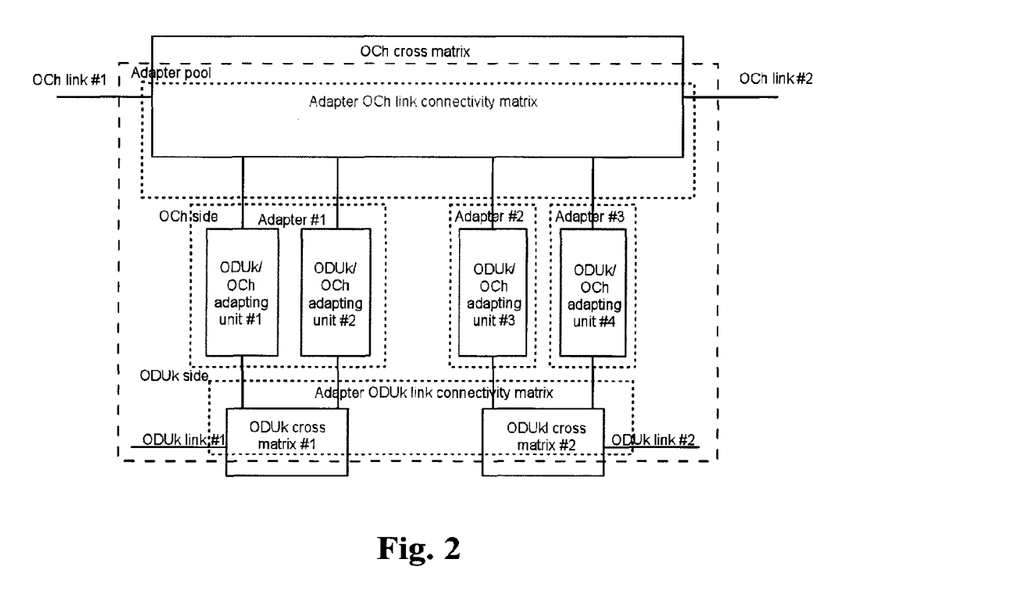
FIG. 2 is a schematic diagram of the corresponding relationship of an OTN device model and an adapter pool model between an OCh layer and an ODUk layer according to an embodiment of the present invention.

FIG. 1 is schematic a diagram of an adapter pool model between an OCh layer and an ODUk layer according to an embodiment of the present invention, as shown in FIG. 1, the model mainly comprises three parts: an adapter OCh link connectivity matrix, an adapter and an adapter ODUk link connectivity matrix, wherein the adapter is configured to describe the adapter capability; the adapter OCh link connectivity matrix is connected to a OCh link, for example, from OCh link 1 to OCh link 4; the adapter ODUk link connectivity matrix is connected to a ODUk link, for example, from ODUk link 1 to ODUk link 4. FIG. 2 is a schematic diagram of the corresponding relationship of an OTN device model and an adapter model between an OCh layer and an ODUk layer according to an embodiment of the present invention, and the models of the main parts of the apparatus in FIG. 2 are described hereinafter;

OCh link, which is configured to bear the link connected by the OCh;

OCh cross matrix: a unit which is configured to switch OCh signals;

processing unit between the OCh layer and the ODUk layer (ODUk/OCh adapting unit): it is mainly configured to convert OCh signals and ODUk signals;

ODUk cross matrix: a unit which is mainly configured to switch ODUk signals; and ODUk link: it is configured to bear the link connected by the ODUk.

The adapter is a combination of ODUk/OCh adapting units, as the OCh cross matrix is connected with the ODUk cross matrix through multiple ODUk/OCh adapting units, then all the ODUk/OCh adapting units which are connected with one same OCh cross matrix and ODUk cross matrix and have a same adapting rate are taken as one adapter. The adapter and the OCh link connectivity matrix are mainly configured to describe the connectivity between the OCh link interface and the interface of the adapter on the OCh side; as the OCh cross matrix can be asymmetrical, for example, a reconfigurable ADD drop multiplexer (ROADM) device, the OCh link interface and the interface of the adapter on the OCh side are not connected for sure. And the adapter and the ODUk link connectivity matrix are mainly configured to describe the connectivity between the interface of the adapter on the ODUk side and the ODUk link interface, and as multiple ODUk cross matrixes are exist, each ODUk link is connected with one or more adapters through the ODUk cross matrix.

As to the OTN device model shown in FIG. 2, the ODUk/OCh adapting unit #1 and the adapting unit #2 are synchronously connected with the OCh cross matrix and the ODUk cross matrix #1, and suppose that both the adapting unit #1 and the adapting unit #2 can adjust the ODU2 to the OCh, then the adapting #1 and the adapting #2 are taken as the adapter #1. Although the adapting unit #3 and the adapting unit #4 are synchronously connected with the OCh cross matrix and the ODUk cross matrix #2, but suppose that the adapting unit #3 can adjust the ODU3 to the OCh, and the adapting unit #4 only can adjust the ODU2 to the OCh, then the adapting unit #3 is taken as the adapter #2, and the adapting unit #4 is taken as the adapter #3.

Figure 3:
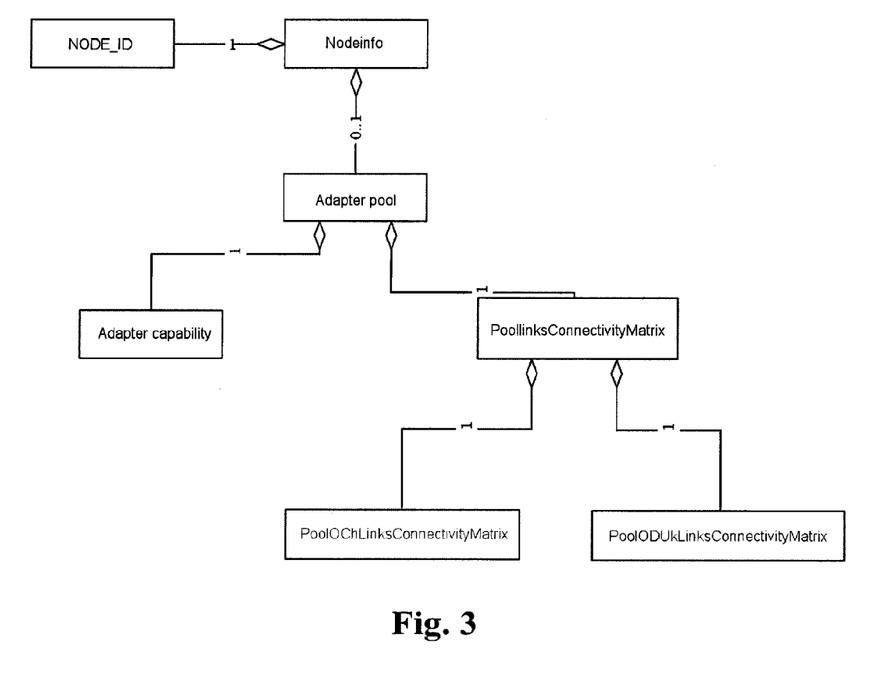
FIG. 3 is a schematic diagram of an extension content of a routing protocol of an adapter pool between an OCh layer and an ODUk layer according to an embodiment of the present invention.

FIG. 3 is a schematic diagram of an extension content of a routing protocol of an adapter pool between an OCh layer and an ODUk layer according to an embodiment of the present invention, as shown in FIG. 3, the adapter capability is mainly configured to describe the adapter capability of the adapter, the PoolLinksConnectivityMatrix is configured to describe the connectivity between the adapter pool and the link interface, the PoolOChLinksConnectivityMatrix is configured to describe the connectivity between the adapter pool and the OCh link interface, and the PoolODUkLinksConnectivityMatrix is configured to describe the connectivity between the adapter pool and the ODUk link interface, the Nodeinfo is configured to identify the information of the present node, and the Node_ID is configured to identify the present node.

Figure 4:
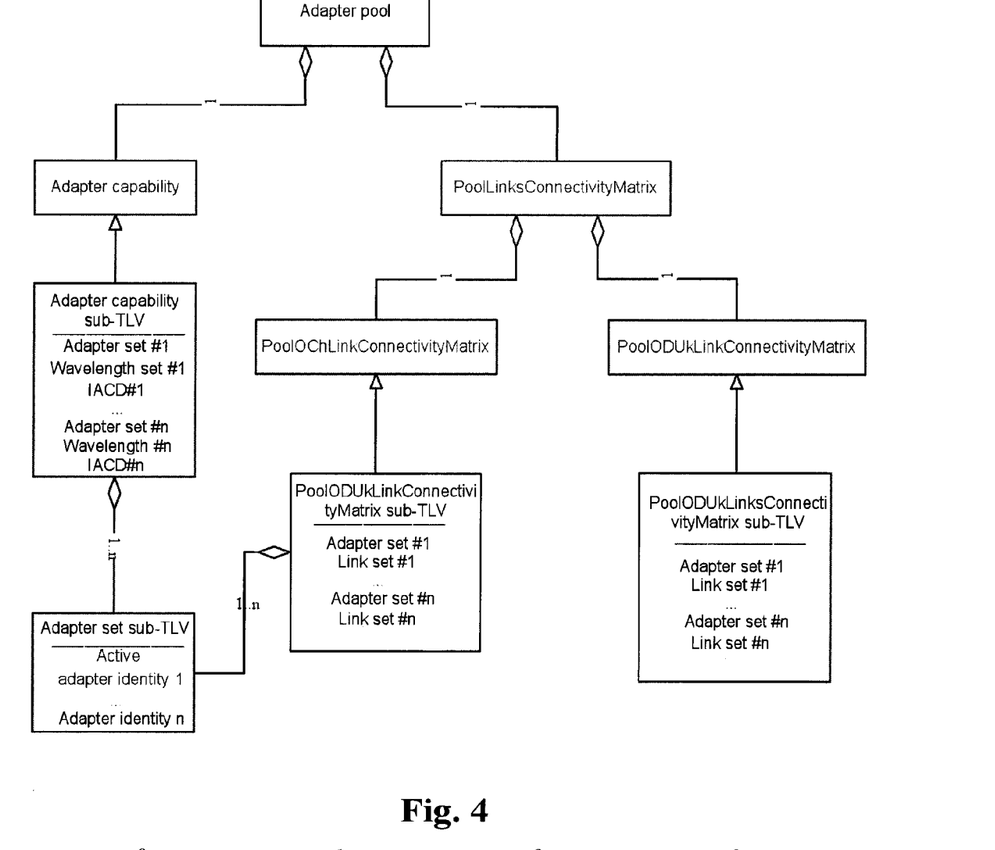
FIG. 4 is a schematic diagram of a specific description of a routing protocol extension content of an adapter pool between an OCh layer and an ODUk layer according to an embodiment of the present invention.

FIG. 4 is a schematic diagram of a specific description of a routing protocol extension content of an adapter pool between an OCh layer and an ODUk layer according to an embodiment of the present invention, and it is mainly used for specifically describing the information in the adapter capability (AdapterCapability) extended in FIG. 3. As shown in FIG. 4, the AdapterCapability mainly comprises one or more adapter sets, wavelength sets and IACD; the PoolOChLinksConnectivityMatrix comprises one or more adapter sets and OCh link set; the PoolODUkLinksConnectivityMatrix comprises one or more adapter sets and ODUk link set. The adapter set comprises an adapter identity, the specific encoding of each part of the AdapterCapability refers to the following definition of sub-TLV.

Figure 5:
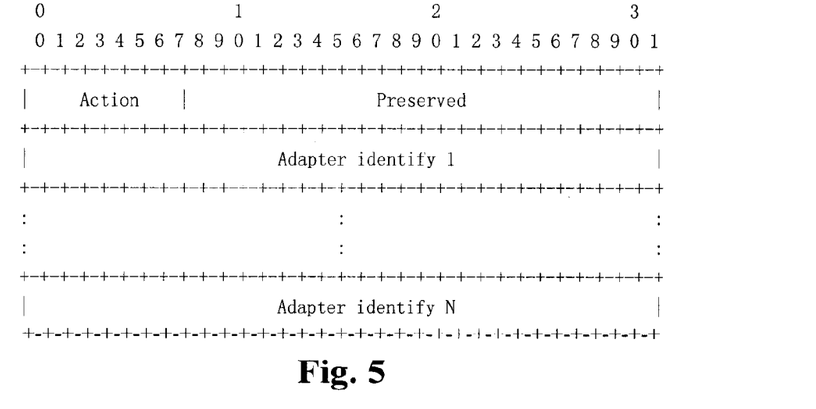
FIG. 5 is a schematic diagram of a encoding of an adapter set sub-type/length/value (sub-TLV) between an OCh layer and an ODUk layer shown in FIG. 4 according to an embodiment of the present invention.

FIG. 5 is a schematic diagram of a encoding of an adapter set sub-Type/Length/Value (sub-TLV) between an OCh layer and an ODUk layer shown in FIG. 4 according to an embodiment of the present invention, as shown in FIG. 5:

Action: this field is represented by 8 bits, and it is configured to describe the representation mode of the adapter ID sequence, when its value is 0, it represents that one adapter linked list is comprised, and each adapter ID is not necessarily continuous. When its value is 1, it represents that an adapter range is comprised, and each adapter ID is continuous, thus only the starting adapter ID and the ending adapter ID need to be described.

Adapter Identify Number: this field is represented by 32 bits, and each 32 bits represent an adapter ID. If the adapter ID sequence is represented using the linked list, then there are N 32-bit fields, and each of them represents an adapter ID. If the adapter ID is represented by a range, then there are two 32-bit fields, and the first one represents the starting adapter ID, the second one represents the ending adapter ID.

Figure 6:
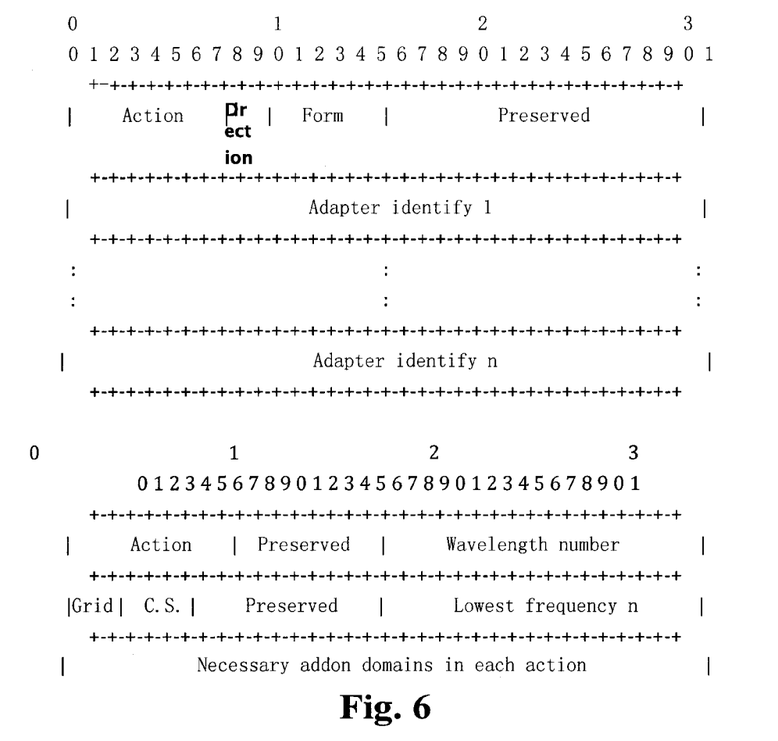
FIG. 6 is a schematic diagram of a set encoding of a link set and a wavelength set sub-TLV according to an embodiment of the present invention.

FIG. 6 is a schematic diagram of a encoding of a link set and a wavelength set sub-TLV according to an embodiment of the present invention, wherein, the specific standard definition of this encoding is described in the draft-ietf-ccamp-rwa-wson-encoding, here will not repeat it redundantly.

Figure 7:
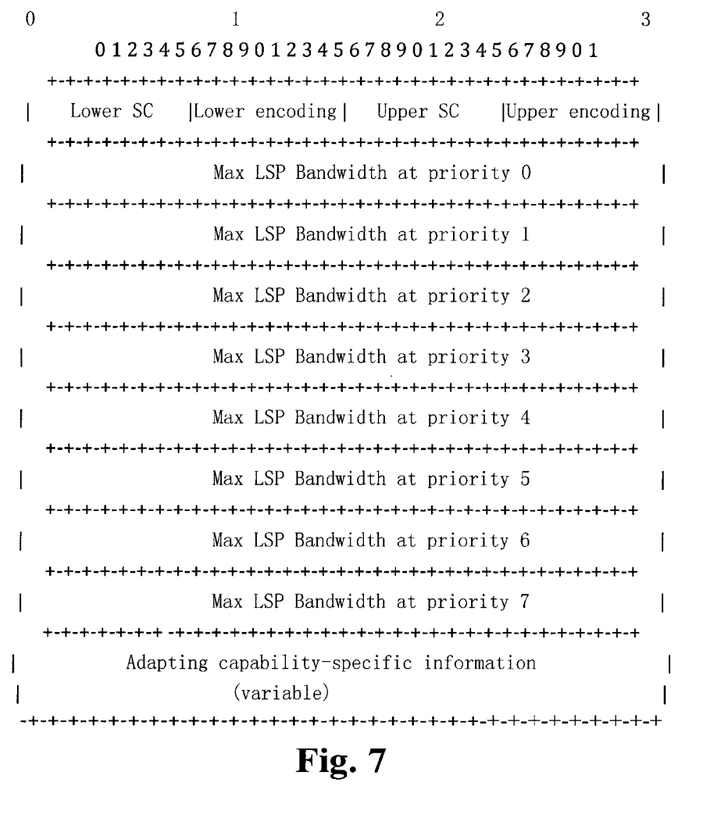
FIG. 7 is a schematic diagram of a encoding of IACD sub-TLV and an extension of the additional information according to an embodiment of the present invention.

FIG. 7 is a schematic diagram of a encoding of IACD sub-TLV and an extension of the additional information according to an embodiment of the present invention; the sub-TLV is defined in the draft-ietf-ccamp-gmpls-mln-extensions, wherein the specific parameters are described as follows:

lower switching capability (Lower SC): it is configured to describe the switching capability of the lower link interface used to adjust, its values are TDM, LSC and FSC, and its value is LSC or FSC in the OTN device;

Lower Encoding: it is configured to describe the encoding of the lower link interface, and for the OTN device, its value is G.709 Optical Channel;

upper switching capability (Upper SC): it is configured to describe the switching capability of the upper link interface used to be adjusted, its values are PSC, L2SC, TDM and LSC, and its value is TDM in the OTN device;

Upper Encoding: it is configured to describe the encoding of the upper link interface, and for the OTN device, its value is G.709 ODUk (Digital Path);

Max LSP Bandwidth at priority X: it is configured to describe the maximum adjustable bandwidth at priority X; and Adapting Capability-specific information: it is additional information, and the additional information is different when the value of switching capability is different.

Figure 8:
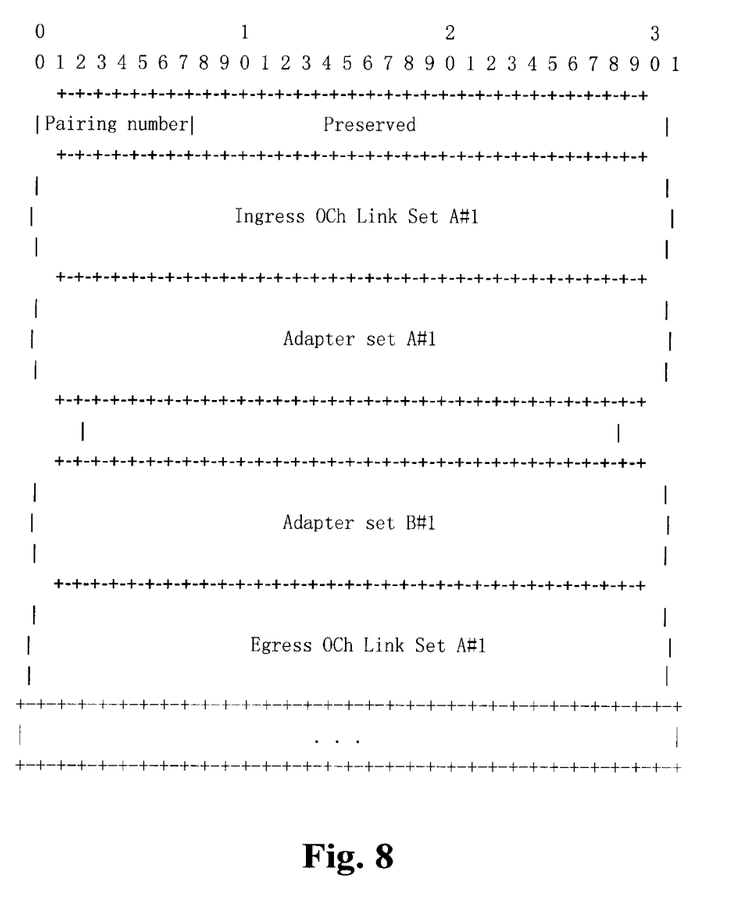
FIG. 8 is a schematic diagram of a encoding of an OCh link connectivity matrix sub-TLV and an adapter between an OCh layer and an ODUk layer according to an embodiment of the present invention.

FIG. 8 is a schematic diagram of a encoding of an OCh link connectivity matrix sub-TLV and an adapter between an OCh layer and an ODUk layer according to an embodiment of the present invention, which is used for describing the connectivity of the adapter and the OCh link, and as the OCh cross matrix can be asymmetrical, for example, the ROADM device, it needs to respectively describe the connectivity of the inlet and outlet.

Figure 9:
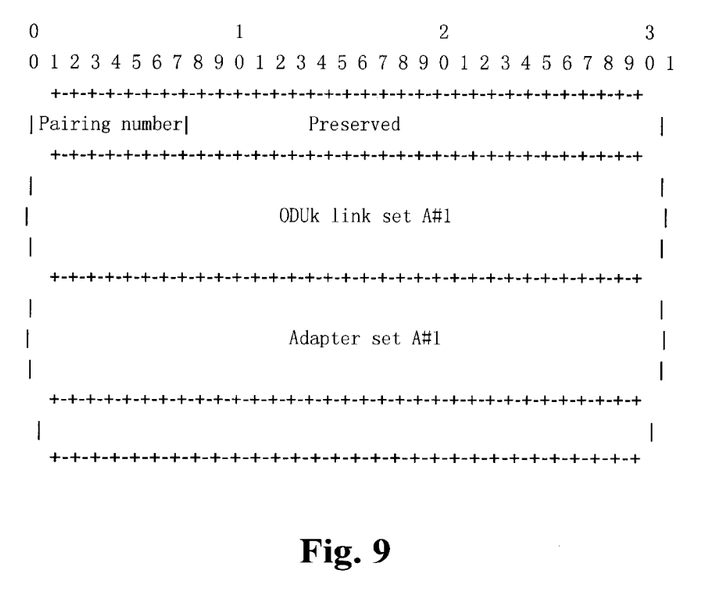
FIG. 9 is a schematic diagram of a encoding of an ODUk link connectivity matrix sub-TLV and an adapter between an OCh layer and an ODUk layer according to an embodiment of the present invention.

For example, as shown in FIG. 2, the adapter #1 is connected with the ingress direction of the OCh link #1, and is connected with the egress direction of the OCh link #2; but the adapters #2 and #3 are both connected with the ingress/egress directions of the OCh link #1, and the representation mode is as follows:

pairing number: 3;
the first pair of information is as follows:
ingress OCh link set: OCh link #1; and
adapter set: adapter #1, adapter #2, adapter #3;
the second pair of information is as follows:
adapter set: adapter #1;
egress OCh link set: OCh link #2; and
the third pair of information is as follows:
adapter set: adapter #2, adapter #3; and
egress OCh link set: OCh link #1;

FIG. 9 is a schematic diagram of a encoding of an ODUk link connectivity matrix sub-TLV and an adapter between an Och layer and an ODUk layer according to an embodiment of the present invention, which is configured to describe the connectivity of the adapter and the ODUk link, and as the ODUk cross matrix is completely symmetrical, it does not need to independently describe from the ingress and egress directions.

Figure 10:
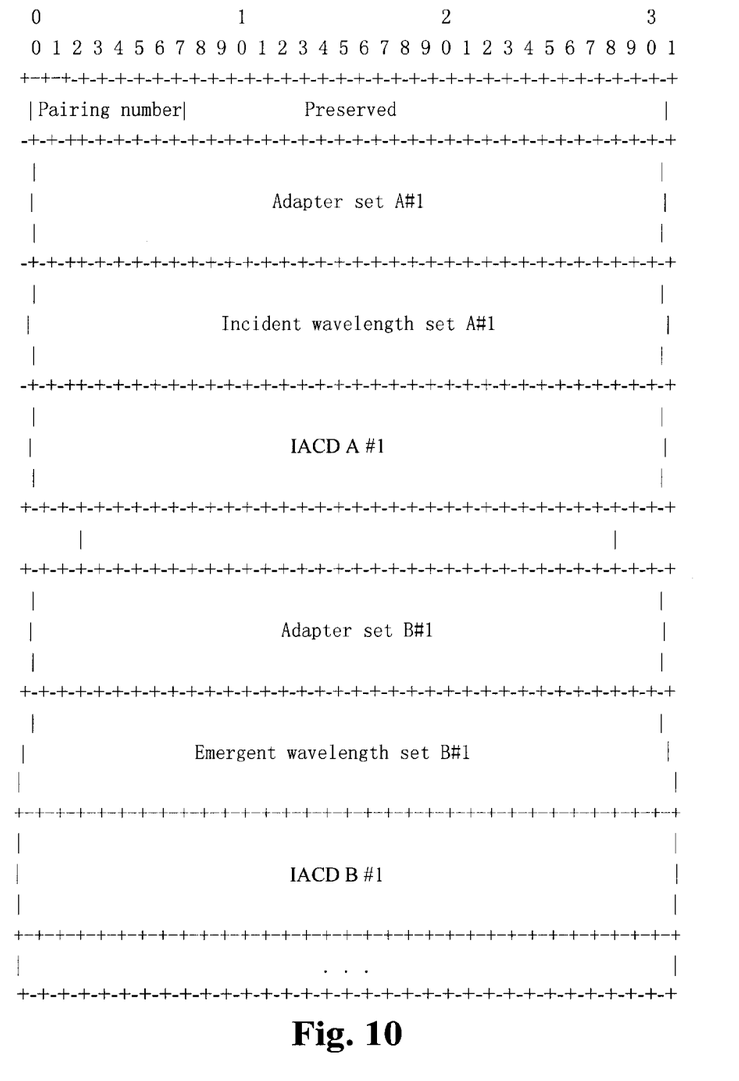
FIG. 10 is a schematic diagram of a encoding of an adapter capability sub-TLV between an OCh layer and an ODUk layer according to an embodiment of the present invention.

For example, as shown in FIG. 2, the adapter #1 is connected with the ODUk link #1, and the adapters #2 and #3 are connected with the ODUk link #2, the representation mode is as follows:

pairing number: 2;
the first pair of information is as follows:
ODUk link set: ODUk link #1; and
adapter set: adapter #1;
the second pair of information is as follows:
ODUk link set: ODUk link #2; and
adapter set: adapter #2, adapter #3;

FIG. 10 is a schematic diagram of a encoding of an adapter capability sub-TLV between an OCh layer and an ODUk layer according to an embodiment of the present invention, which is configured to describe the adapter capability of the adapter, as the OCh cross matrix is asymmetrical, the available wavelengths reversely adjusted to the ODUk from the OCh is not certainly completely consistent with the available wavelengths adjusted to the OCh from the ODUk. So the ingress and egress need to be independently described.

For example, as shown in FIG. 2, the available wavelengths of the adapter #1 from OCh→ODUk are $\lambda 1$-$\lambda 12$, and the available wavelengths from ODUk→OCh are $\lambda 1$-$\lambda 15$; the available wavelengths of the adapter #2 from the OCh→ODUk are $\lambda 1$-$\lambda 2$, and are $\lambda 1$-$\lambda 5$ from the ODUk→OCh; the available wavelengths of the adapter #3 from the OCh-ODUk are $\lambda 1$-$\lambda 12$, and are $\lambda 1$-$\lambda 50$ from ODUk→OCh. The specific description of the adapter capability of each adapter is as follows:

adapter set: adapter #1, adapter #3;
ingress wavelength set: $\lambda 1$-$\lambda 12$;
IACD
lower switching capability: LSC;
lower encoding: G.709 Optical Channel;
upper switching capability: TDM;
upper encoding: G.709 ODUk (Digital Path); and
maximum adapting bandwidth: ODU2;
adapter set: adapter #2;
ingress wavelength set: $\lambda 1$-$\lambda 2$;
IACD
lower switching capability: LSC;
lower encoding: G.709 Optical Channel;
upper switching capability: TDM;
upper encoding: G.709 ODUk (Digital Path);and
maximum adapting bandwidth: ODU3;
adapter set: adapter #1;
egress wavelength set: $\lambda 1$-$\lambda 15$;
IACD
lower switching capability: LSC;
lower encoding: G.709 Optical Channel;
upper switching capability: TDM;
upper encoding: G.709 ODUk (Digital Path); and
maximum adapting bandwidth: ODU2;
adapter set: adapter #2;
ingress wavelength set: $\lambda 1$-$\lambda 5$;
IACD
lower switching capability: LSC;
lower encoding: G.709 Optical Channel;
upper switching capability: TDM;
upper encoding: G.709 ODUk (Digital Path); and
maximum adapting bandwidth: ODU3;

adapter set: adapter #3;
ingress wavelength set: λ1-λ50;
IACD
lower switching capability: LSC;
lower encoding: G.709 Optical Channel;
upper switching capability: TDM;
upper encoding: G.709 ODUk (Digital Path); and
maximum adapting bandwidth: ODU2;

An adapting method for managing the adapting information between the photoelectric layers in the OTN is provided according to an embodiment of the present invention, and the method which is corresponding to the apparatus mentioned above comprises:

setting an adapter pool between an ODUk layer and an OCh layer, wherein the adapter pool comprises one or more adapters which are respectively connected to an OCh layer link and an ODUK layer link; for each adapter, management information of the adapter pool comprises: information for indicating connectivity of the adapter with the OCh layer link and with the ODUk layer link, and information for indicating an adapter capability of the adapter.

Preferably, all adapting units which are connected to a same OCh cross matrix and to a same ODUk cross matrix, and have a same adapting rate are taken as one same adapter.

In the above, the adapter is connected with the OCh layer link through an OCh layer link connectivity matrix, wherein the OCh layer link connectivity matrix is configured to indicate connectivity between an interface on the OCh side of the adapter and an interface of the OCh layer link connected with the adapter; the adapter is connected with the ODUk layer link through an ODUk link connectivity matrix, wherein the ODUk link connectivity matrix is configured to indicate connectivity between an interface on the ODUk side of the adapter and an interface of the ODUk layer link connected with the adapter.

Preferably, the information of the adapter pool between the OCh layer and the ODUk layer is flooded as a constraint attribute in a node.

In summary, the information of the adapter pool between the OCh layer and the ODUk layer in the OTN is flooded as a constraint attribute in a node through the above embodiment, that can improve the description of the adapting capability between MRNs in the OTN when managing the OTN devices as photoelectric mixed nodes, and the adapting information between MRNs can be described more accurately comparing with the existed standard which uses the IACD to describe it, and the correctness of the route calculation results is also guaranteed. In addition, taking the adapter pool information between the OCh and ODUk layers as a node attribute rather than a link attribute is also more accordant with the characteristics of the adapter capability between MRNs.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not limited to any particular combination of hardware and software.

Above description is only to illustrate the preferred embodiments but not to limit the present invention. Various alternations and changes to the present invention are apparent to those skilled in the art. The scope defined in claims shall comprise any medication, equivalent substitution and improvement within the spirit and principle of the present invention.

What is claimed is:

1. An adapting apparatus, configured to manage adapting information between photoelectric layers in an optical transport network (OTN), comprising:
   an adapter pool, wherein the adapter pool is located between an optical data unit (ODUk) layer and an optical channel (OCh) layer, and the adapter pool comprises one or more adapters which are respectively connected to an OCh layer link and an ODUK layer link;
   the information that the adapter pool used for managing comprises: information for indicating connectivity of the adapter with the OCh layer link and with the ODUk layer link, and information for indicating an adapter capability of the adapter;
   wherein the adapter is connected with the OCh layer link through an OCh layer link connectivity matrix, wherein the OCh layer link connectivity matrix is configured to indicate the connectivity between an interface on the OCh side of the adapter and an interface of the OCh layer link connected with the adapter; the adapter is connected with the ODUk layer link through an ODUk link connectivity matrix, wherein the ODUk link connectivity matrix is configured to indicate the connectivity between an interface on the ODUk side of the adapter and an interface of the ODUk layer link connected with the adapter.

2. The apparatus according to claim 1, wherein the adapter comprises all adapting units which are connected to a same OCh cross matrix and to a same ODUk cross matrix, and have a same adapting rate.

3. The apparatus according to claim 1, wherein the information for indicating the connectivity of the adapter with the OCh layer link and with the ODUk layer link comprises:
   information for indicating connectivity between the adapter and the OCh layer link interface, and information for indicating connectivity between the adapter and the ODUk layer link interface.

4. The apparatus according to claim 3, wherein the information for indicating an adapter capability of the adapter comprises adapter capability descriptions of multiple adapter sets, and each set comprises: one or more adapters, one or more wavelengths and one interface adapting capability description (IACD); information for indicating connectivity between an input direction of the adapter and the OCh layer link interface comprises multiple groups of connectivity information, and each group comprises: one or more OCh layer input interfaces, and one or more adapters; information for indicating connectivity between an output direction of the adapter and the OCh layer link interface comprises multiple groups of connectivity information, and each group comprises one or more adapters, and one or more OCh link input interfaces; information for indicating connectivity between the adapter and the ODUk layer link interface comprises multiple groups of connectivity information, and each group comprises: one or more adapters, and one or more ODUk link interfaces.

5. The apparatus according to claim 1, wherein it further comprises:
   a flooding module, configured to flood the information of the adapter pool between the OCh layer and the ODUk layer as a constraint attribute in a node.

6. An adapting method, for managing the adapting information between photoelectric layers in OTN, comprising:

setting an adapter pool between an ODUk layer and an OCh layer, wherein the adapter pool comprises one or more adapters which are respectively connected to an OCh layer link and an ODUk layer link;

for each adapter, information of the adapter pool comprises: information for indicating connectivity of the adapter with the OCh layer link and with the ODUk layer link, and information for indicating an adapter capability of the adapter;

wherein the adapter is connected with the OCh layer link through an OCh layer link connectivity matrix wherein the OCh layer link connectivity matrix is configured to indicate connectivity between an interface on the OCh side of the adapter and an interface of the OCh layer link connected with the adapter; the adapter is connected with the ODUk layer link through an ODUk link connectivity matrix, wherein the ODUk link connectivity matrix is configured to indicate connectivity between an interface on the ODUk side of the adapter and an interface of the ODUk layer link connected with the adapter.

7. The method according to claim 6, wherein all adapting units which are connected to a same OCh cross matrix and to a same ODUk cross matrix, and have a same adapting rate are taken as one same adapter.

8. The method according to claim 6, wherein the information of the adapter pool between the OCh layer and the ODUk layer is flooded as a constraint attribute in a node.

9. The apparatus according to claim 2, wherein the information for indicating the connectivity of the adapter with the OCh layer link and with the ODUk layer link comprises: information for indicating connectivity between the adapter and the OCh layer link interface, and information for indicating connectivity between the adapter and the ODUk layer link interface.

10. The apparatus according to claim 1, wherein the information for indicating the connectivity of the adapter with the OCh layer link and with the ODUk layer link comprises:

information for indicating connectivity between the adapter and the OCh layer link interface, and information for indicating connectivity between the adapter and the ODUk layer link interface.

11. The apparatus according to claim 2, wherein it further comprises:

a flooding module, configured to flood the information of the adapter pool between the OCh layer and the ODUk layer as a constraint attribute in a node.

12. The apparatus according to claim 1, wherein it further comprises:

a flooding module, configured to flood the information of the adapter pool between the OCh layer and the ODUk layer as a constraint attribute in a node.

13. The method according to claim 7, wherein the information of the adapter pool between the OCh layer and the ODUk layer is flooded as a constraint attribute in a node.

14. The method according to claim 6, wherein the information of the adapter pool between the OCh layer and the ODUk layer is flooded as a constraint attribute in a node.

\* \* \* \* \*